(12) United States Patent
Waible et al.

(10) Patent No.: US 12,337,801 B2
(45) Date of Patent: Jun. 24, 2025

(54) WIPER BLADE AND WIPER DEVICE FOR CLEANING A VEHICLE WINDSCREEN

(71) Applicant: VALEO SYSTEMES D'ESSUYAGE, La Verriere (FR)

(72) Inventors: Siegfried Waible, Bietigheim-Bissingen (DE); Michael Buss, Bietigheim-Bissingen (DE)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/262,405

(22) PCT Filed: Jan. 17, 2022

(86) PCT No.: PCT/EP2022/050829
§ 371 (c)(1),
(2) Date: Jul. 21, 2023

(87) PCT Pub. No.: WO2022/157093
PCT Pub. Date: Jul. 28, 2022

(65) Prior Publication Data
US 2024/0217484 A1  Jul. 4, 2024

(30) Foreign Application Priority Data
Jan. 19, 2021 (DE) .......................... 102021101018.7

(51) Int. Cl.
*B60S 1/38* (2006.01)
*B60S 1/40* (2006.01)

(52) U.S. Cl.
CPC ........... *B60S 1/3851* (2013.01); *B60S 1/3806* (2013.01); *B60S 1/3849* (2013.01); *B60S 1/40* (2013.01); *B60S 1/4083* (2013.01); *B60S 1/4087* (2013.01)

(58) Field of Classification Search
CPC .... B60S 1/3848; B60S 1/3863; B60S 1/3849; B60S 1/4083; B60S 1/4087; B60S 1/4009; B60S 1/4045; B60S 1/4003; B60S 1/3806
(Continued)

(56) References Cited

U.S. PATENT DOCUMENTS 9,783,164 B2   10/2017   Friscioni
10,029,652 B2   7/2018   Herinckx et al.
(Continued)

FOREIGN PATENT DOCUMENTS

DE        10340140        3/2005
DE    102014114688 A1     4/2016
(Continued)

OTHER PUBLICATIONS

European Patent Office, International Search Report and Written Opinion of corresponding International Application No. PCT/EP2022/050829, dated Apr. 28, 2022.
(Continued)

*Primary Examiner* — Gary K. Graham
(74) *Attorney, Agent, or Firm* — Valeo Systemes d'Essuyage

(57) ABSTRACT

The invention relates to a wiper blade for cleaning a vehicle windscreen, wherein the wiper blade has a wiper blade body of flat construction and a wiper blade adapter connected to the wiper blade body, wherein the wiper blade adapter has a first adapter element, which is connected to the wiper blade body, and a second adapter element, which is connected pivotably to the first adapter element and is designed to receive an end portion of a wiper arm.

11 Claims, 1 Drawing Sheet

(58) Field of Classification Search
USPC ........................................ 15/250.32, 250.351
See application file for complete search history.

(56)  References Cited

U.S. PATENT DOCUMENTS

| | | | |
|---|---|---|---|
| 2010/0205763 A1* | 8/2010 | Ku | B60S 1/387 |
| | | | 15/250.32 |
| 2011/0047742 A1* | 3/2011 | Kim | B60S 1/4067 |
| | | | 15/250.32 |
| 2013/0067674 A1* | 3/2013 | Chiang | B60S 1/4003 |
| | | | 15/250.32 |
| 2013/0333144 A1 | 12/2013 | Depondt | |
| 2019/0039574 A1 | 2/2019 | McGee et al. | |

FOREIGN PATENT DOCUMENTS

| | | | |
|---|---|---|---|
| GB | 920059 | * | 3/1963 |
| JP | H6-35064 U | | 5/1994 |
| JP | H11-268617 A | | 10/1999 |
| JP | 2006290220 A | | 10/2006 |
| JP | 2011068171 A | | 4/2011 |
| JP | 2013545666 A | | 12/2013 |
| KR | 1020170110406 A | | 10/2017 |

OTHER PUBLICATIONS

Japan Patent Office, Search Report (with English translation) of corresponding Japanese Patent Application No. JP2024-503130, dated May 9, 2024.

Japan Patent Office, Office Action (with English translation) of corresponding Japanese Patent Application No. JP2024-503130, dated May 14, 2024.

* cited by examiner

WIPER BLADE AND WIPER DEVICE FOR CLEANING A VEHICLE WINDSCREEN

TECHNICAL FIELD

The invention relates to a wiper blade and a wiper device for cleaning a vehicle windscreen, in particular a vehicle front windscreen, a particularly good cleaning action combined with a compact structure of the wiper blade being achieved.

BACKGROUND OF THE INVENTION

A wiper blade for cleaning a vehicle windscreen having the features of the preamble of claim 1 is known from the applicant's document DE 10 2014 114688 A1. The known wiper blade is distinguished by a wiper blade body, which can be connected to a wiper arm via a wiper blade adapter. The known wiper blade also has a spoiler element, which extends in the longitudinal direction of the wiper blade body, for increasing the contact pressure in the direction of the vehicle windscreen.

When such a wiper blade is in operation, it has been found in practice that the negative pressure created at the rear side when there is an incident flow at the wiper blade owing to the relative wind makes it possible for water located behind the wiper blade adapter on the vehicle windscreen to be returned to the field of view by the wiper blade when the wiper blade moves counter to the incident flow direction. This wiping error is also referred to as "water pullback" error.

DISCLOSURE OF THE INVENTION

The wiper blade according to the invention having the features of claim 1 has the advantage that the above-described effect of water being pulled back in the wiper blade adapter region on account of a negative pressure, arising at the wiper blade, at the wiper blade rear side when the wiper blade moves counter to its incident flow direction can be reduced and, in the best case, even completely prevented. For this purpose, the teaching of the invention proposes designing a wiper blade for cleaning a vehicle windscreen in such a way that the second adapter element of the wiper blade adapter is designed to receive the cross-sectionally preferably rectangular, flat end portion of the wiper arm, which is formed in an S-shape on the side of the wiper blade, and that, in the region of side surfaces running in particular parallel to the wiper blade body, the wiper blade adapter has at least one through opening for flow to pass through the wiper blade adapter in a direction running transversely to the longitudinal direction of the wiper blade. In this respect, the above-mentioned advantage of the wiper blade is achieved, in particular by the combination of the two features mentioned. The structural configuration of the second adapter element in combination with the S-shaped end portion of the wiper arm has the advantage in particular that the overall height of the wiper blade adapter can be reduced, as a result of which a reduction in the negative pressure arising at the rear side of the wiper blade adapter can already be achieved. In addition, by virtue of the at least one through opening, the effect is achieved that the relative wind flows through the wiper blade adapter, with the result that a further significant reduction in the negative pressure in the region of the wiper blade adapter can be achieved.

Advantageous developments of the wiper blade according to the invention for cleaning a vehicle windscreen are stated in the dependent claims.

In order to allow through openings, through which the relative wind can flow, in the wiper blade adapter given the sought-for minimization of the overall height of the wiper blade adapter, a particularly preferred embodiment of the wiper blade adapter provides that at least one through opening is formed in the two adapter elements of the wiper blade adapter, which through openings are arranged in line with one another in a direction running perpendicularly to a longitudinal direction of the wiper blade. The in-line arrangement of the through openings in the two adapter elements in particular allows the cross section of the (continuous) aperture created by the through openings to be maximized.

In a further, structurally preferred embodiment of the wiper blade adapter, it is provided that a plurality of through openings arranged symmetrically in relation to a central plane of the wiper blade adapter are formed. This achieves in particular a homogeneous or uniform flow through the wiper blade adapter, or a constant, reduced negative pressure over the length of the wiper blade adapter, at the rear side of the wiper blade adapter.

In a non-limitative embodiment of the wiper blade adapter, it is provided that shape respectively the cross section of the through openings located in the adapter elements is at least substantially identical.

A further preferred embodiment of the wiper blade adapter provides that, on the side facing away from the wiper blade body, the first adapter element has a cross-sectionally U-shaped cutout for receiving the second adapter element, and that the first adapter element has a further through opening at a height below the receptacle.

In a non-limitative embodiment of the wiper blade adapter, it is provided that the further through opening is located below the plane respectively the bottom side of the second adapter element.

To maximize the cross section of this further through opening, it is in particular in the form of a longitudinal slot, wherein the longitudinal slot extends parallel to the longitudinal direction of the adapter element or of the wiper blade body. This additionally achieves, when there is a predefined size of the through opening, a minimization of the overall height of the wiper blade adapter.

Since the second adapter element is designed to receive the end portion of the wiper arm at the same time, this end portion prevents flow from passing through the second adapter element. In order to minimize this effect, it is provided that through openings formed in the region of the second adapter element have a first height which is larger than a second height of the end portion in the region of the second adapter element.

To minimize the overall height of the wiper blade adapter and to achieve a wiper blade adapter which has a design protected as far as possible against dirt or similar mechanical influences, it is furthermore provided that the top sides of the two adapter elements of the wiper blade adapter are aligned in line with one another and form the common top side of the wiper blade adapter.

The invention furthermore also comprises a wiper device for cleaning a vehicle windscreen, having an above-described wiper blade according to the invention and a wiper arm, which has a first portion arranged on the side facing away from the wiper blade adapter and a second portion formed for connection to the wiper blade adapter, wherein the two portions of the wiper arm are connected to one another via a preferably S-shaped connecting portion, in such a way that the two portions run parallel to one another at least close to the connecting portion.

In a development of a connecting portion of this type, it is provided that it is arranged in the region of the wiper blade body close to the wiper blade adapter. This makes it possible to minimize the overall size of a cutout optionally provided on a spoiler element on the wiper blade top side, without the wiper arm coming into contact with the spoiler element.

Further advantages, features and details of the invention will become apparent from the following description of preferred embodiments of the invention and with reference to the drawings.

DETAILED DESCRIPTION OF THE INVENTION

Identical elements or elements having an identical function are denoted by the same reference numbers in the figures.

Figure 1:
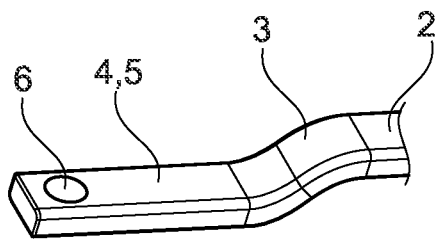
FIG. 1 shows a perspective view of a wiper arm as constituent part of a wiper device for cleaning a vehicle windscreen.
Figure 2:
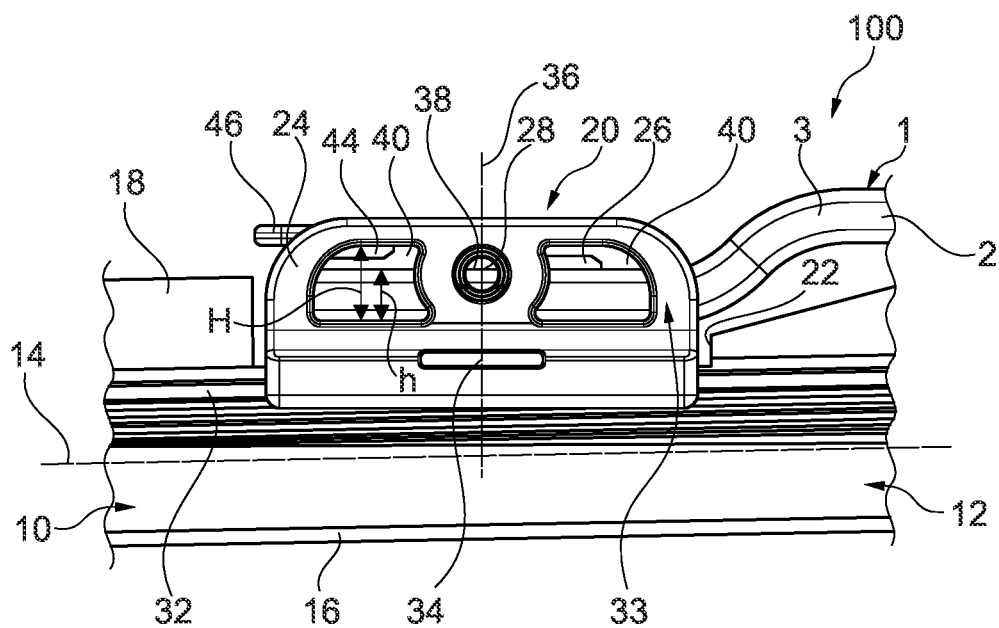
FIG. 2 shows a front view of the constituent parts of a wiper device.
Figure 3:
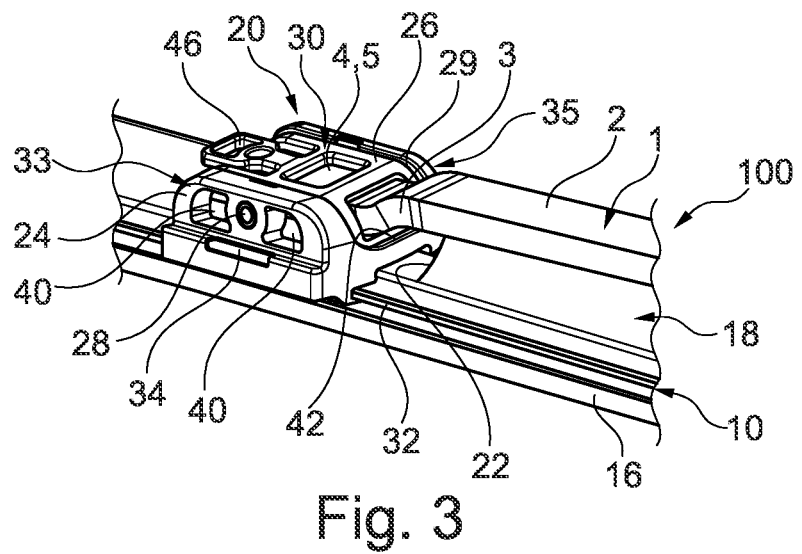
FIG. 3 shows a perspective illustration of the wiper device of FIG. 2.

FIGS. 2 and 3 illustrate a wiper device 100 for cleaning a vehicle windscreen (not shown), in particular a vehicle front windscreen. In a manner known per se, the wiper device 100 comprises a wiper blade 10, which can be moved back and forth between two reversal positions on the vehicle windscreen and is fastened to the wiper arm 1. On the side facing away from the wiper blade 10, the wiper arm 1 has a first portion 2 which is connected to a second portion 4 via an S-shaped connecting portion 3. The two portions 2 and 4 are arranged at least substantially parallel to one another at least close to the wiper blade 10, the second portion 4 forming an end portion 5 of the wiper arm 1 at the same time, to which end portion the wiper blade 10 can be fastened. For this, the end portion 5 having preferably a rectangular cross section at least in the region of the end portion 5 has a through opening 6, for example, which serves to fix the wiper blade 10 in the longitudinal direction of the end portion 5.

The wiper blade 10, of flat construction, has a wiper blade body 12 which extends in the direction of a longitudinal axis 14. On the side facing towards the vehicle windscreen (not shown), the wiper blade body 12 has a wiper lip 16 for making contact with the vehicle windscreen. On the side facing away from the wiper lip 16, a spoiler element 18, which has a cutout 22 in the region of a wiper blade adapter 20, extends in the longitudinal direction of the wiper blade body 12.

The wiper blade adapter 20 has a first adapter element 24 which is connected to the wiper blade body 12 and a second adapter element 26 which can be connected to the end portion 5 of the wiper arm 1. The two adapter elements 24, 26, which consist of plastic and are produced by an injection molding method, are arranged such that they can be pivoted in relation to one another about a certain angle in the region of an axis of rotation 28, in order—as is known per se—to allow, in the event of a movement of the wiper blade body 12 along the vehicle windscreen, in particular in the case of a curved vehicle windscreen, continuous contact that is as uniform as possible of the wiper lip 16 on the vehicle windscreen.

On the top side, which faces away from the wiper blade body 12, the first adapter element 24 has a cross-sectionally U-shaped cutout 29, in which the second adapter element 26 is received. The top sides of the two adapter elements 24, 26 form a common, flat top side 30 of the wiper blade adapter 20.

The first adapter element 24 additionally has, in a manner known per se, receiving grooves that run in the longitudinal direction and are designed to engage in a straddling manner around spring rails 32 arranged in the wiper blade body 12 in longitudinal grooves, in order to fasten the wiper blade adapter 20 to the wiper blade body 12. In a plane above the spring rails 32, but below the second adapter element 26 received in the cutout 29, the first adapter element 24 has a through opening 34, which is in the form of a longitudinal slot, on opposite side surfaces running parallel to the wiper blade body 12 or the longitudinal axis 14 thereof. The through opening 34 runs symmetrically in relation to a plane of symmetry 36 intersecting the axis of rotation 28. Additionally, the through opening 34 is located below the plane respectively the bottom side of the second adapter element 26 in such a way that the cross section of the through opening 34 in at least substantially, preferably not limited by the second adapter element 26. It can furthermore be seen with reference to FIGS. 2 and 3 that, in the mounted state of the wiper blade adapter 20, further through openings 38, 40 are formed both in the first adapter element 24 and in the second adapter element 26, wherein the through openings 38, 40 are arranged in line with one another in the operating position of the wiper blade 10. The further through openings 38, 40, at least the further through openings 40, have at least substantially the same shape respectively the same cross section in order to maximize air flow through the further through openings 38, 40. By way of example, the through opening 38 is formed concentrically to the axis of rotation 28 and has a round internal cross section. By contrast, the two through openings 40 have an approximately rectangular form, these through openings having a first height H which is greater than a second height h of the end portion 5 of the wiper arm 1 that is received inside the second adapter element 26.

The second adapter element 26 has a cross-sectionally at least approximately rectangular receptacle 42 for receiving the end portion 5. The end portion 5 is detachably fixed in its longitudinal direction in the second adapter element 26 by means of a latching element 44, integrally formed on the second adapter element 26, on a latching tongue 46. For this purpose, the latching tongue 46, which is in the form of a latching cam and is formed on the latching element 44 on the side facing towards the end portion 5, engages in the through opening 6 in the end portion 5.

With reference to FIGS. 2 and 3, it can be seen in addition that the top side 30 of the wiper blade adapter 20 projects only slightly in terms of height above the top side of the wiper blade body 12 in the region of the spoiler element 18. It can also be seen that the connecting portion 3 is arranged close to the wiper blade adapter 20.

During driving operation of the vehicle or in the event of actuation of the wiper device 100, the relative wind flows through the wiper blade adapter 20 in the region of the through openings 34, 38 and 40, with the result that a minimized or reduced negative pressure can be achieved at the rear side, as viewed with respect to the incident flow direction, of the wiper blade body 12.

The above-described wiper device 100 or the wiper blade 10 may be altered or modified in a wide variety of ways without departing from the concept of the invention.

LIST OF REFERENCE SIGNS

1 Wiper arm
2 First portion
3 Connecting portion
4 Second portion
5 End portion
6 Through opening
10 Wiper blade
12 Wiper blade body
14 Longitudinal axis
16 Wiper lip
18 Spoiler element
20 Wiper blade adapter
22 Cutout
24 First adapter element
26 Second adapter element
28 Axis of rotation
29 Cutout
30 Top side
32 Spring rail
33 Side surface
34 Through opening
35 Side surface
36 Plane of symmetry
38, 40 Through opening
42 Receptacle
44 Latching element
46 Latching tongue
100 Wiper device
h, H Height

What is claimed is:

1. A wiper blade for cleaning a vehicle windscreen, comprising
the wiper blade having a wiper blade body;
a wiper blade adapter connected to the wiper blade body;
the wiper blade adapter having a first adapter element, which is connected to the wiper blade body; and
a second adapter element, which is connected pivotably to the first adapter element, the second adapter element designed to receive an end portion of a wiper arm;
where the first adapter element has a cross-sectional cutout for receiving the second adapter element on a side opposing the wiper blade body and where the first adapter element has a first through opening at a height below the cross-sectional cutout;
where the second adapter element of the wiper blade adapter is designed to receive a flat end portion of the wiper arm, which has a connecting portion formed in an S-shape on a side of the wiper blade; and
the wiper blade adapter having a second through opening for flow to pass through the wiper blade adapter in a direction running transverse to the longitudinal direction of the wiper blade body.

2. The wiper blade of claim 1, where the second through opening includes a second through opening is formed in each of the two adapter elements of the wiper blade adapter; the second through openings are arranged inline with one another through opening in a direction running perpendicular to a longitudinal direction of the wiper blade.

3. The wiper blade of claim 1, where a plurality of second through openings are arranged symmetrical in relation to a plane of symmetry of the wiper blade adapter.

4. The wiper blade of claim 3, a shape of each cross section of each second through openings is at least substantially identical within the wiper adapter.

5. The wiper blade of claim 1, where on the side opposing the wiper blade body, said cutout of the first adapter element is a U-shaped cutout.

6. The wiper blade of claim 5, where the first through opening is located along a plane of symmetry of the wiper blade adapter at respectively a bottom side of the second adapter element.

7. The wiper blade of claim 6, where the first through opening is in the form of a longitudinal slot.

8. The wiper blade of claim 1, where the second through opening is formed in a region of the second adapter element and has at least partially a first height (H) which is greater than a second height (h) of the end portion in the region of the second adapter element.

9. The wiper blade of claim 1, where a top side of each of the two adapter elements are arranged in-line with one another and form a top side of the wiper blade adapter.

10. A wiper device for cleaning a vehicle windscreen, having
a wiper blade designed according to claim 1 and
a wiper arm, which has a first portion arranged on a side facing away from the wiper blade adapter and a second portion formed for connection to the wiper blade adapter, wherein the first and second portions of the wiper arm are connected to one another via a connecting portion, which is S-shaped such that the first and second portions run parallel to one another near the connecting portion.

11. A wiper device according to claim 10, where the connecting portion is arranged in a region of the wiper blade body near the wiper blade adapter.

* * * * *